_United States Patent Office_ 3,492,982
Patented Feb. 3, 1970

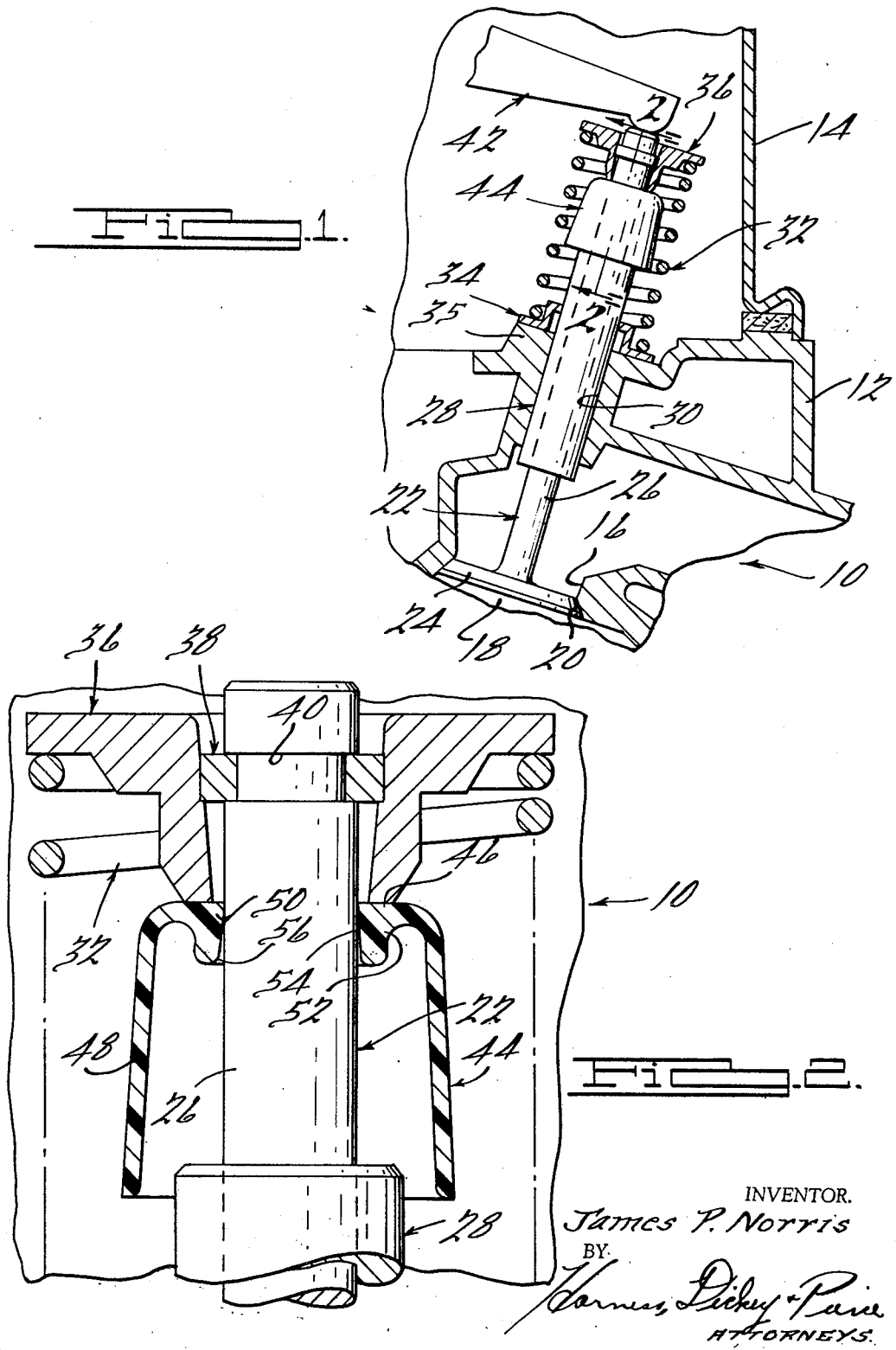

3,492,982
VALVE STEM OIL DEFLECTOR
James P. Norris, Itasca, Ill., assignor, by mesne assignments, to Microdot Inc., New York, N.Y., a corporation of California
Filed Dec. 29, 1967, Ser. No. 694,469
Int. Cl. F01l 3/06; F16j 15/32, 9/04
U.S. Cl. 123—188                            1 Claim

ABSTRACT OF THE DISCLOSURE

An oil deflector adapted to be mounted on the stem of a valve of an internal combustion engine; the deflector comprising a generally cup-shaped member having a radially extending body section and an integral axially extending skirt section; the body section including an interiorly extending neck section defining a tapered bore adapted to receive the valve stem therewithin, the bore tapering from a diameter slightly smaller than the valve stem to a diameter slightly larger than the valve stem and, means including an enlarged thickness portion formed circumjacent the neck section for purposes of rigidifying the neck section in order to provide for positive sealing engagement of the periphery of the bore with the valve stem.

BACKGROUND OF THE INVENTION

In modern internal combustion engines, as are commonly found in automotive vehicles, the valve stem of each intake and exhaust valve is slidably mounted within a suitable guide section of the engine head, with the valve heads positioned internally of the combustion chambers of the engine block and the outer ends of the valve stems positioned so as to be actuated by an associated rocker arm assembly. Oil or a similar lubricant is supplied within the rocker arm cover in order to lubricate the valve stems and associated guides, and as wear occurs in the guides and/or valve stems, the lubricating oil tends to be drawn into the combustion chambers during the intake portion of the operational cycle of such engines, with the result that the oil is burned, causing smoke in the engine exhaust, as well as a waste of the lubricating oil.

While a great variety of different styles of sealing devices and oil deflectors have been known and used in the prior art for preventing lubrication oil from entering the combustion chambers of internal combustion engines, the growing concern over reduced manufacturing expenses and attendant assembly costs has emphasized the need for an oil seal or deflector that can be economically manufactured, easily installed and which is universally applicable. One type sealing assembly that has been found to exhibit superior sealing characteristics in preventing the ingress of lubricating oil around an internal combustion engine valve stem is shown and described in copending application Ser. No. 440,899, filed Mar. 18, 1965, for "Valve Seal."

Generally speaking, the valve seal assembly shown in the aforementioned copending application comprises a cup-shaped body having an outwardly or axially extending neck section formed on the upper end thereof. The seal body is disposed radially outwardly from the valve stem and is adapted to deflect oil away from the valve stem so as to prevent the oil from passing into the associated combustion chamber of the engine. While this construction has been found to provide for excellent sealing against lubricating oil passing into the associated combustion chamber circumjacent to the valve stem, due to the dimensional variations and deviations, as well as surface irregularities of the valve seals and valve members themselves, it has been necessary to provide some type of spring retainer or split ring device disposed around the neck sections of the seals in order to fixedly secure the same to the associated valves. Also, such valve seals have been somewhat objectionable from the standpoint that the aforementioned mounting neck sections unnecessarily increased the axial size or length thereof.

The present invention is adapted to overcome the aforementioned objectionable characteristics of the above type valve seals through the provision of a novel oil deflector which comprises a generally cup-shaped member having an interiorly directed neck section that defines a tapered bore adapted to receive the stem section of the associated engine valve therewithin. The bore is tapered in a manner so as to positively sealingly engage the periphery of the valve stem regardless of any dimensional variations therein, whereby to provide for universality of application. Moreover, the oil deflector of the present invention is provided with a rigidifying portion circumjacent the neck section thereof which permits the deflector to be mounted without the use of any of the aforementioned spring retainers or the like. Also, by virtue of the fact that the neck section extends interiorly of the deflector, the axial length thereof is minimized to the extreme, thus permitting installation in engines wherein the space within the valve cover or between the engine head and associated rocker arm assembly is at a premium.

SUMMARY OF THE INVENTION

This invention relates generally to seals and, more particularly, to a new and improved oil deflector adapted for use in automotive and similar type internal combustion engines.

It is a general object of the present invention to provide a new and improved oil deflector that is of an extremely simple and economical construction.

It is a more particular object of the present invention to provide a new and improved oil deflector which is characterized by improved means for sealingly engaging the valve stem of an associated automotive engine valve.

It is another object of the present invention to provide a new and improved oil deflector of the above character which is designed so as to occupy a minimum amount of space.

It is yet another object of the present invention to provide an oil deflector as above described which is adapted to automatically compensate for any tolerance deviations in the deflector construction or in the size of the associated valve stem.

It is a further object of the present invention to provide a new and improved oil deflector construction that is particularly easy to operatively assemble on an associated valve member.

Other objects and advantages of the present invention will become apparent from the following detailed description taken in conjunction with the accompanying drawing.

BRIEF DESCRIPTION OF THE DRAWING

FIGURE 1 is a fragmentary cross sectional view of a portion of a conventional internal combustion engine having an oil deflector in accordance with a preferred embodiment of the present invention in operative association therewith, and FIGURE 2 is an enlarged cross sectional view taken substantially along the line 2—2 of FIGURE 1.

DESCRIPTION OF A PREFERRED EMBODIMENT

Referring now to the drawing, a conventional automotive engine 10 of the ovehead valve type is shown as comprising a head 12 having a valve lifter or rocker arm cover 14 mounted thereon and secured thereto in any known or suitable manner. The engine head 12 is provided with a passage 16 communicating with a combustion chamber fragmentarily shown herein at 18, the lower end of the passage 16 defining an annular valve seat 20. The valve seat 20 is adapted to be selectively opened and closed by means of a conventional valve member 22 having a valve head section 24 adapted to sealingly engage the valve seat 20. The valve member 22 also comprises a valve stem section 26 reciprocable by means of a valve guide 28 disposed within a cylindrical annulus 30 defined by the engine head 12.

The upper end of the valve stem 26 is surrounded by a helical compression spring 32 which is supported at the lower end thereof by an annular bushing or spring locater 34 coaxially located about the valve guide 28 and bearing against a fixed portion 35 of the engine head 12. The upper end of the spring 32 abuts against a spring retainer member 36 held in place by a conventional valve spring retainer lock 38 that is partially disposed within an annular groove 40 adjacent the upper end of the valve stem 26. One end of a rocker arm, generally designated 42, bears against the upper end of the valve stem 26 and is adapted to effect reciprocal movement of the valve member 22 in a manner well known in the art.

In accordance with the principles of the present invention, the valve member 22 is provided with a valve stem oil deflector, best illustrated in FIGURE 2 and generally designated by the numeral 44. Generally speaking, the oil deflector 44 is of an inverted cup-shape configuration and comprises a radially outwardly extending body section 46 which terminates at its radially outermost edge in an annular downwardly depending skirt section 48. The body section 46, as well as the skirt section 48, is preferably fabricated of a molded resinous plastic material which is resistant to heat up to approximately 300° F. without losing its form and/or shape. One preferable material is nylon which has been found to not only have the requisite heat resistant characteristics, but is also available at an economical price. It will be readily apparent, of course, that many other different types of plastic materials could be used in fabricating the deflector 44 of the present invention.

In a preferred construction of the present invention, the deflector sections 46 and 48 are integral of one another, and the skirt section 48 flares outwardly a slight amount toward the lower end thereof. As illustrated in FIGURE 2, the sections 46, 48 are of substantially uniform thickness with the body section 46 being formed with an integral, enlarged thickness and downwardly or interiorly extending neck section 50 that is located coaxially and radially inwardly from the skirt section 48. An integral fillet portion 52 is provided around the juncture of the sections 46 and 50 for purposes of rigidifying and strengthening the neck section 50, as will later be described.

The neck section 50 of the oil deflector 44 is formed with a central opening or bore 54 through which the valve stem 26 extends and which is uniformly tapered radially inwardly toward the upper end of the deflector 44, with the result that the diameter of the lower end of the bore 54 is somewhat larger than the diameter of the upper end thereof. By way of example, in a preferred embodiment of the oil deflector 44 illustrated herein, the bore 54 is tapered a rate of approximately ½ inch per foot. The size (diameter) of the bore 54 is selected such that the lower end thereof is slightly larger than the diameter of the valve stem 26, while the upper end of the bore 54 is somewhat smaller in diameter than the valve stem 26. Also, the lower end of the bore 54 is flared radially outwardly a slight amount, as seen at 56.

A particular advantage of the above construction resides in the fact that the tapered configuration of the bore 54, together with the provision of the outwardly flared portion 56, enables the oil deflector 44 to be easily mounted or assembled onto the upper end of the valve stem 26 due to the relatively larger size of the opening at the lower end of the bore 54 with respect to the size of the valve stem 26. Moreover, by virtue of the fact that the bore 54 decreases in size toward the upper end of the deflector 44, the inner periphery of the bore 54 will tightly sealingly engage the outer periphery of the valve stem 26 as the deflector 44 is assembled thereon. Since the bore 54 is tapered, the periphery thereof will be sealingly engaged with the exterior of the valve stem 26, even through there may be some dimensional variation in the construction of these members, thereby automatically compensating for any tolerance deviation in either the deflector 44 or valve member 22.

A further advantage of the above construction of the present invention is achieved as a result of the enlarged thickness of the neck section 50 and the fillet portion 52 adjacent thereto. In particular, the above construction provides for increased rigidity of the neck section 50 and thus more positive gripping or sealing engagement of the inner periphery of the bore 54 with the outer periphery of the valve stem 26. Accordingly, after such time as the oil deflector 44 is operatively assembled on the valve member 22, said deflector will be positively secured to the valve stem 26 without the need of any auxiliary mounitng means such as retainer rings, spring clamps, or the like, thereby minimizing manufacturing costs and attendant assembly time and expense.

One additional advantage of the oil deflector 44 of the present invention resides in the fact that the neck section 50 extends interiorly of the skirt section 48, as opposed to axially outwardly (upwardly), from the body section 46. This construction permits the deflector 44 to be fixedly secured to the associated valve stem 26, as above described, yet minimizes the overall length of the deflector 44, with the result that the deflector 44 may be installed on engines wherein the available space within the valve cover or between the engine head and the associated rocker arms is at a premium.

The oil deflector 44 of the present invention is adapted to be assembled upon the valve stem 26 prior to the compression spring 32 and its associated parts being assembled thereon, but after placement of the bushing or spring locater 34 about the valve stem guide 28. The deflector 44 is initially disposed relatively adjacent to the guide 28, and the first time the valve 22 is biased to an open position (downwardly), the deflector 44 abuts or engages the upper end of the valve guide 28 and is biased axially of the valve stem 26 to a predetermined position, which position the deflector 44 will permanently assume on the valve stem 26 during subsequent operation of the engine 10.

In operation, the valve stem oil deflector 44 of the present invention is adapted to function in deflecting the lubricating oil within the valve cover 14 away from the upper end of the passage 30, thereby preventing such oil from entering into the combustion chamber 18 of the engine 10. It will be noticed that by virtue of the tight sealing engagement between the outer periphery of the valve stem 26 and the periphery of the bore 54, none of the aforementioned lubricating oil will flow downwardly along the valve member 22 between the deflector 44 and the valve stem 26.

It will be seen from the foregoing description that the present invention provides a novel oil deflector construction which may be economically manufactured and easily assembled on the associated valves of almost all types of automotive engines. By virtue of the tapered configuration of the bore 50, the deflector 44 of the present invention may be effectively installed on practically all appropriate size valve members, regardless of any dimensional or tolerance deviations thereof. Moreover, the deflector 44 of the present invention may be installed where there is a minimum amount of space and be positively secured to the associated valve member, whereby to assure against any relative movement between the valve member and the deflector after it has been properly located on the valve stem.

What is claimed is:

1. In an oil deflector adapted to be mounted on the stem of a valve of an internal combustion engine,
- a one-piece, generally cup-shaped member fabricated of a synthetic elastomeric material,
- said member comprising a generally radially extending body section having a downwardly and radially outwardly flared skirt section depending therefrom and integrally connected thereto,
- said body section having an axially downwardly extending neck section integrally connected thereto and defining therewith an axially extending bore adapted to receive the stem of a valve therewithin,
- the periphery of said bore being tapered radially outwardly and downwardly with the upper end thereof being at least slightly smaller in diameter than the valve stem and the lower end thereof being at least slightly larger in diameter than the valve stem, whereby the deflector may be fixedly mounted on the valve stem regardless of any minor dimensional variations thereof,
- the lower end of said bore terminating in a generally arcuate edge portion blending smoothly into the periphery of said bore for facilitating mounting of the deflector on the valve stem, and
- said member being formed with an enlarged thickness portion adjacent the juncture of said neck and body sections, whereby to rigidify and strengthen said neck section in order to assure sealing engagement of the periphery of said bore with the valve stem.

References Cited

UNITED STATES PATENTS

| | | |
|---|---|---|
| 2,753,008 | 7/1956 | Peirce _____ 277—178 X |
| 2,859,993 | 11/1958 | Estey. |
| 2,876,759 | 3/1959 | Duesenberg. |
| 2,878,799 | 3/1959 | Brenneke. |
| 2,999,492 | 9/1961 | Duesenberg. |
| 3,171,659 | 3/1965 | Anderson et al. _____ 277—33 |

AL LAWRENCE SMITH, Primary Examiner

U.S. Cl. X.R.

123—90; 277—33, 152, 178